United States Patent [19]
Baldwin et al.

[11] Patent Number: 6,042,152
[45] Date of Patent: Mar. 28, 2000

[54] INTERFACE SYSTEM BETWEEN COMPOSITE TUBING AND END FITTINGS

[75] Inventors: Donald D. Baldwin; John A. Reigle; Mark D. Drey, all of Lincoln, Nebr.

[73] Assignee: Technical Products Group, Inc., Atlanta, Ga.

[21] Appl. No.: 08/942,414

[22] Filed: Oct. 1, 1997

[51] Int. Cl.$^7$ ................................................... F16L 39/02
[52] U.S. Cl. ............................ 285/55; 285/239; 285/259; 285/222.1
[58] Field of Search ................ 285/259, 222.1–222.5, 285/55, 238, 239, 242, 256, 252, 245

[56] References Cited

U.S. PATENT DOCUMENTS

| | | | |
|---|---|---|---|
| 237,324 | 1/1881 | Reynolds | 285/259 |
| 590,258 | 9/1897 | Dale | 285/259 |
| 768,188 | 8/1904 | McIntyre | 285/222.2 |
| 1,980,466 | 11/1934 | Angeja | 285/222.3 |
| 2,661,225 | 12/1953 | Lyon | 285/259 |
| 2,750,210 | 6/1956 | Trogdon et al. | 285/222.4 |
| 2,973,975 | 3/1961 | Ramberg et al. | 285/259 |
| 3,119,415 | 1/1964 | Gallawoy et al. | . |
| 3,165,338 | 1/1965 | Moss | 285/259 |
| 3,347,571 | 10/1967 | New et al. | 285/222.4 |
| 3,381,715 | 5/1968 | Michael | . |
| 3,423,109 | 1/1969 | New et al. | 285/222.1 |
| 3,495,627 | 2/1970 | Pierpont, Jr. | . |
| 3,951,438 | 4/1976 | Scales | 285/259 |
| 4,358,284 | 11/1982 | Federmann et al. | . |
| 4,385,644 | 5/1983 | Kaempen | . |
| 4,569,541 | 2/1986 | Eisenzimmer | 285/222.1 |
| 5,061,826 | 10/1991 | MacCulloch et al. | . |
| 5,288,109 | 2/1994 | Auberon et al. | . |
| 5,332,049 | 7/1994 | Tew | . |
| 5,443,099 | 8/1995 | Chaussepied et al. | . |

FOREIGN PATENT DOCUMENTS

| | | | |
|---|---|---|---|
| 1528995 | 12/1989 | U.S.S.R. | 285/259 |

*Primary Examiner*—Eric K. Nicholson
*Attorney, Agent, or Firm*—John R. Hoffman

[57] ABSTRACT

An interface system between an end of a filament composite tube and a rigid interior end fitting. The system includes a plurality of traplocks having varying wall thicknesses at the bases thereof. The traplocks also have varying angles of the bearing faces thereof. A Y-shaped seal is disposed between an inboard end of the fitting and the inside of the composite tube.

12 Claims, 4 Drawing Sheets

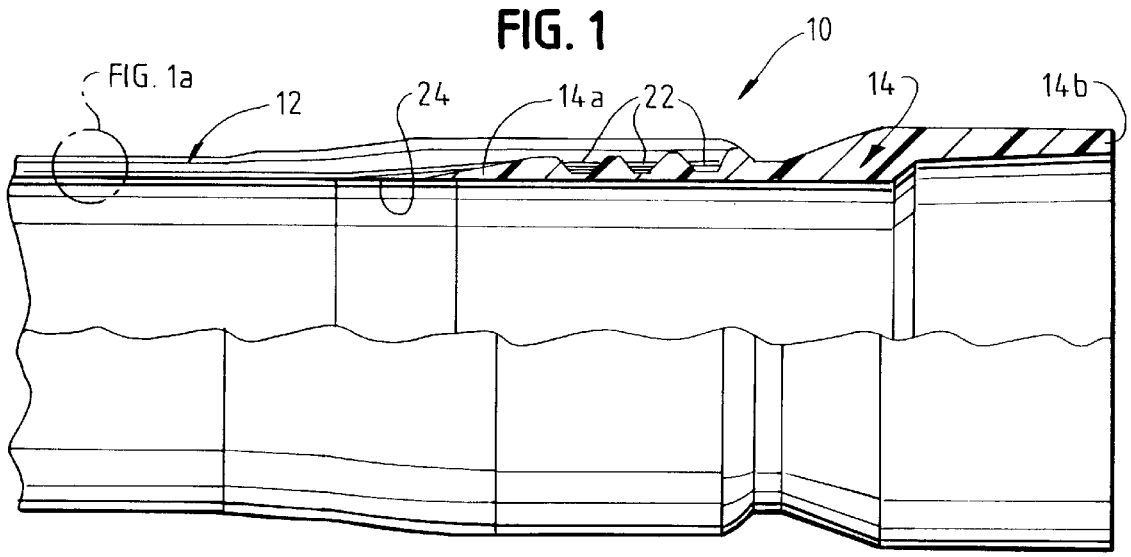
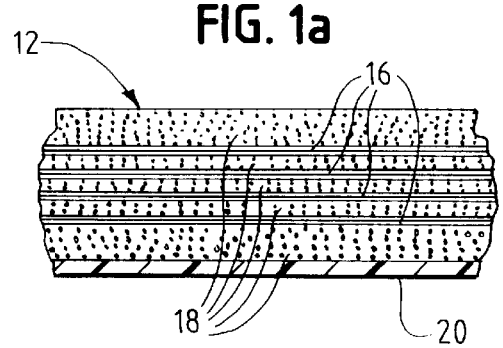

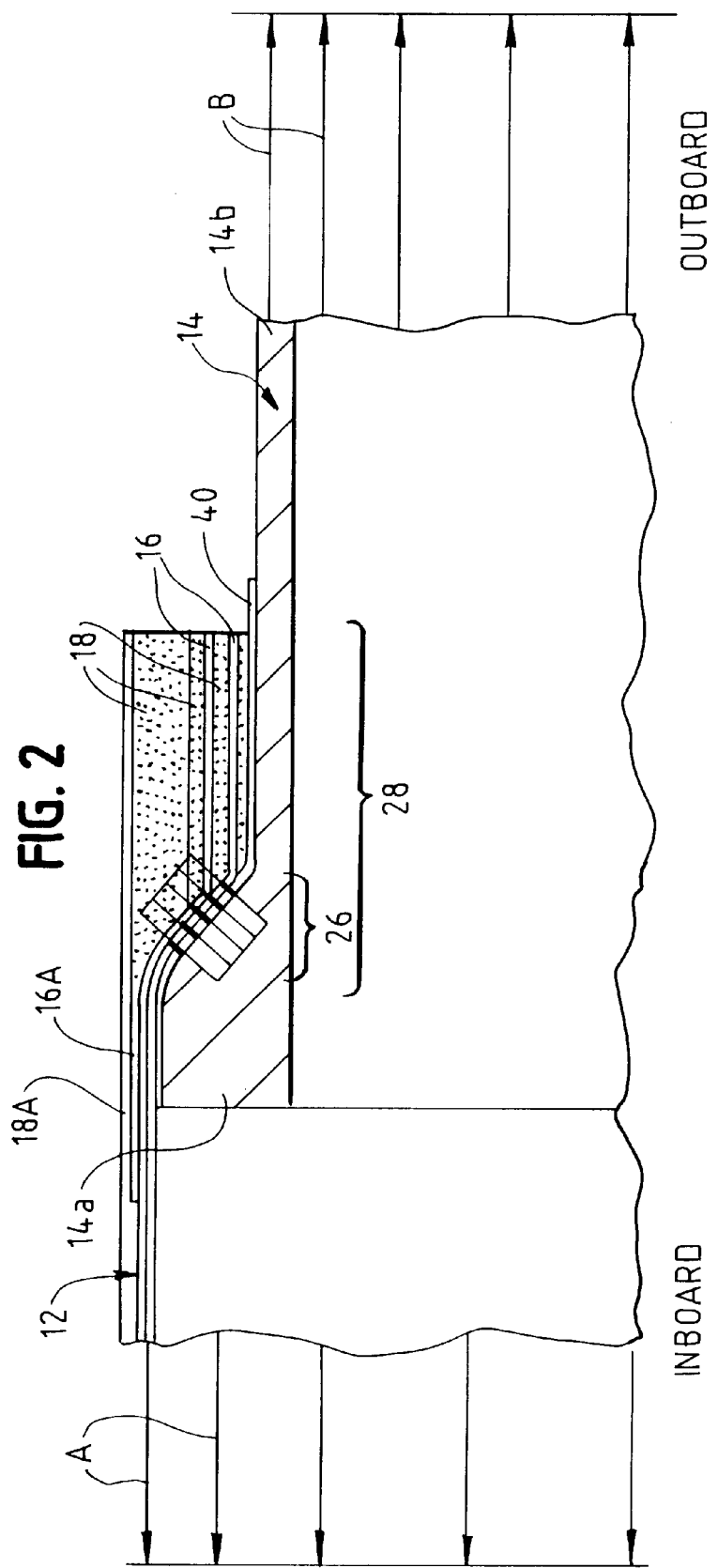

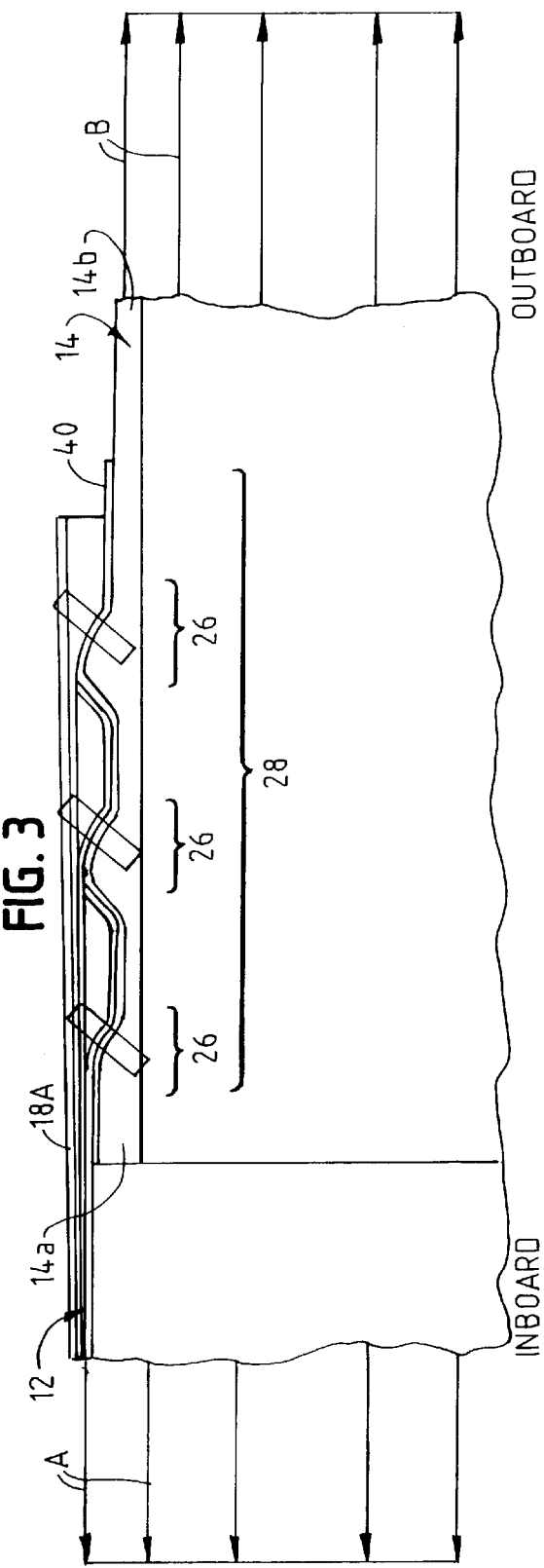
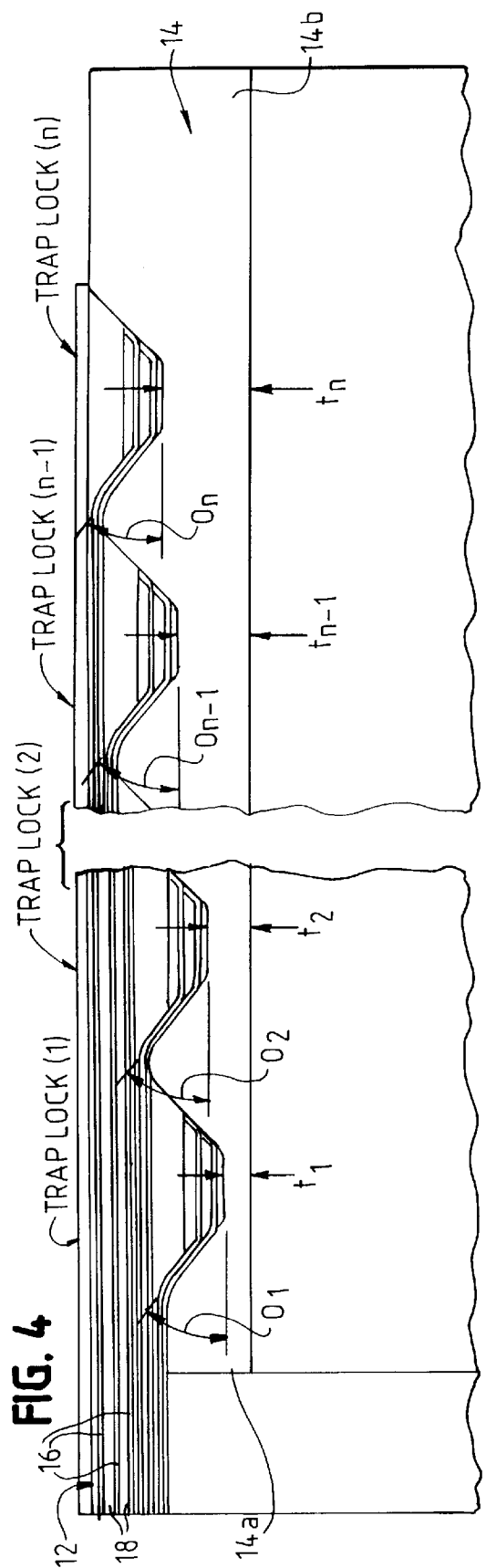

INTERFACE SYSTEM BETWEEN COMPOSITE TUBING AND END FITTINGS

FIELD OF THE INVENTION

The present invention generally relates to the art of filament composite tubes and, particularly, to various features at the interface between a filament composite tube and a rigid end fitting.

BACKGROUND OF THE INVENTION

Filament composite tubes typically include aligned reinforcement fibers in combination with thermosetting or thermoplastic resin. Such tubes are manufactured by the application of resin-impregnated reinforcement fibers or rovings to an internal cylindrical mandrel. The rovings are applied under controlled tension in precise orientations and thicknesses to produce a tube wall with desired properties. This can be accomplished by filament winding, whereby the mandrel is rotated about its centerline and the roving is applied along the mandrel by a carriage assembly. Braiding can also be used, whereby the internal mandrel is passed through roving delivery heads which orbit around the mandrel. Numerous hybrid processes exist which combine features of filament winding and braiding.

Commonly used reinforcement fiber materials are carbon, aramid and glass formulations. The reinforcement fibers may include axial reinforcements or circumferential (hoop) reinforcements. The axial reinforcements are sized to provide the tube with the axial strength and/or stiffness required for a particular application. The circumferential or hoop reinforcements are sized to provide the tube with the circumferential strength and/or stiffness required for a particular application.

The resin stabilizes and transfers load between the reinforcements fibers and protects the fibers from environmental attack. Thermosetting resins such as epoxies, phenolics, vinyl esters and polyesters are most commonly used. Less commonly used are thermoplastics such as nylons. The thermosetting resins are used most commonly because they can be applied to the roving in liquid form, which aids in the removal of entrapped air or volatiles. The resin is solidified by the addition of heat energy, resulting in a rigid fiber-reinforced structure. The internal mandrel then is withdrawn, typically to be used again.

For applications requiring the containment of liquid or gases under pressure, an elastomeric or thermoplastic liner typically is used inside the tube to prevent migration of the contained fluids through the composite wall.

Composite tubes as described above are used in a variety of product applications, including oil and gas production and development applications, including tubing, casing and risers. Such tubes are also representative of a pressure vessel with a large port opening relative to its cylinder diameter, a common configuration for rocket motor cases. They also are used as a structural composite strut or link applicable to light-weight truss or frame systems. In these applications, a joint is required to react primarily to axial loadings, resulting from applied axial tension and/or internal pressure. Joints are required between tube lengths in order to afford good service in these applications. The joints typically are provided by end fittings at wound-in interfaces between the tubes and the fittings. The end fittings are generally hollow, rigid structures typically fabricated of metallic or like material.

The wound-in interface between a filament composite tube and a rigid interior end fitting often includes one or more "traplock" grooves in the exterior of the fitting and into which the filament or reinforcements of the composite tube are wound and/or compacted.

In such a traplock joint, the axial load is transferred between the composite tube and the end fitting through bearing on the inboard or load-carrying face of the traplock groove. The surface area of the load-carrying face is one of the parameters determining the strength of the joint or interface. The bearing area can be increased by increasing the height of the load-carrying face. However, the bearing stress which the composite material can support is relatively low (30 to 50 ksi). The diametral envelope required by a single traplock groove can become quite large as the height of the load-carrying face is increased. The diametral requirements of the joint can be reduced by the use of multiple traplock grooves, but there is no efficient method known for determining the precise number of grooves necessary and such determinations typically are arbitrary. In addition, the use of more than one traplock groove does not necessarily result in improved joint performance. It is desirable that all traplock grooves be equally reinforced and all traplock grooves carry an equal share of the load. If the interface is not designed properly, the load may not be distributed equally between the multiple traplock grooves. It is possible to load any one traplock groove to failure before other traplock grooves carry significant load.

Still further problems are encountered in designing such traplock interfaces because a stiffness mismatch generally exists between the composite tube and the rigid end fitting which often is of metallic material. This stiffness mismatch tends to concentrate the greatest share of the load on either the furthest inboard or the furthest outboard traplock groove, depending on whether the end fitting or the composite tube has higher sectional stiffness. If the fitting is stiffer than the composite tube, this difference in sectional properties sometimes can be lessened by the addition of localized reinforcements in the composite tube. However, this solution can become quite expensive and can result in a large joint diameter relative to the tube body.

Still further problems are encountered in establishing and maintaining a pressure-tight seal between the composite tube and the end fitting. This is particularly true if the composite tube has an interior liner. A pressure-actuated (O-ring) seal, for instance, is not feasible because the fitting is encapsulated in the end of the composite tube during its fabrication. The flow of the resin prior to its consolidation precludes the forming in place of sealing features such as grooves or glands. Reliance on an adhesive bond between the end fitting and the tube liner is not reliable due to the differential movement in the axial direction that is inherent in traplock system operation. As the fitting moves outboard under load, the liner material and adhesive typically cannot accommodate this differential movement without cracking, tearing or unbonding.

The present invention is directed to solving the above myriad of problems by providing features at the interface between a filament composite tube and a rigid end fitting to enhance the properties and performance of the components at the interface.

SUMMARY OF THE INVENTION

An object, therefore, of the invention is to provide a new and improved interface system between a filament composite tube and an end fitting.

Another object of the invention is to provide a new and improved traplock system between an end of a filament composite tube and a generally hollow, rigid interior end fitting.

A further object of the invention is to provide a new and improved sealing system between a filament composite tube and an end fitting, including a composite tube with an elastomeric liner.

In the exemplary embodiment of the invention, the end fitting has an inboard end and an outboard end with a plurality of circumferential exterior grooves defining a plurality of traplocks spaced axially between the ends. The wall thicknesses between the bases of the traplock grooves and the inside of the generally hollow fitting are different for at least some of the traplock grooves. The composite tube has filaments disposed in the traplock grooves of the fitting to lock the tube to the fitting. Preferably, the wall thicknesses at the bases of the traplock grooves increase from the traplock groove nearest the inboard end of the fitting to the traplock groove nearest the outboard end of the fitting. As disclosed herein, the wall thicknesses increase at a uniform rate.

The traplock grooves have angled bearing faces which face toward the outboard end of the fitting and against which the filaments of the composite tube bear. The invention contemplates that the angles of the bearing faces be different for at least some of the traplock grooves.

Preferably, the angles increase from the traplock groove nearest the inboard end of the fitting to the traplock groove nearest the outboard end of the fitting. As disclosed herein, the angles increase at a uniform rate.

In a preferred embodiment, an elastomeric release layer is disposed between the innermost filaments of the composite tube and the outside of the end fitting. The release layer is unbonded to the fitting. The filaments of the composite tube are compacted into the traplock grooves over the release layer. The filaments include axially extending filaments compacted into the groove by circumferentially extending filaments.

Another feature of the invention is the provision of an elastomeric seal between the inboard end of the end fitting and the inside of the filament composite tube. In the exemplary embodiment of the invention, the seal is generally Y-shaped in cross-section to define a pair of diverging arms embracing the inside and the outside of the fitting at the inboard end thereof. Preferably, the composite tube has an interior elastomeric liner, and the Y-shaped seal defines a leg extending from the diverging arms, with the leg being unitary with the liner. The diverging arms of the seal and the end fitting may be provided with complementary interengaging tongue and groove locking means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a fragmented axial section through a composite tube/end fitting interface generally incorporating the system of the invention;

FIG. 2 is a fragmented axial section through the tube/fitting interface of system having a single traplock;

FIG. 3 is a fragmented axial section through a tube/fitting interface having three traplocks;

FIG. 4 is a fragmented axial section through a tube/fitting interface having a plurality of traplock grooves incorporating the detailed features of the invention;

DETAILED DESCRIPTION OF THE PREFERRED EMBODIMENTS

Figure 5:
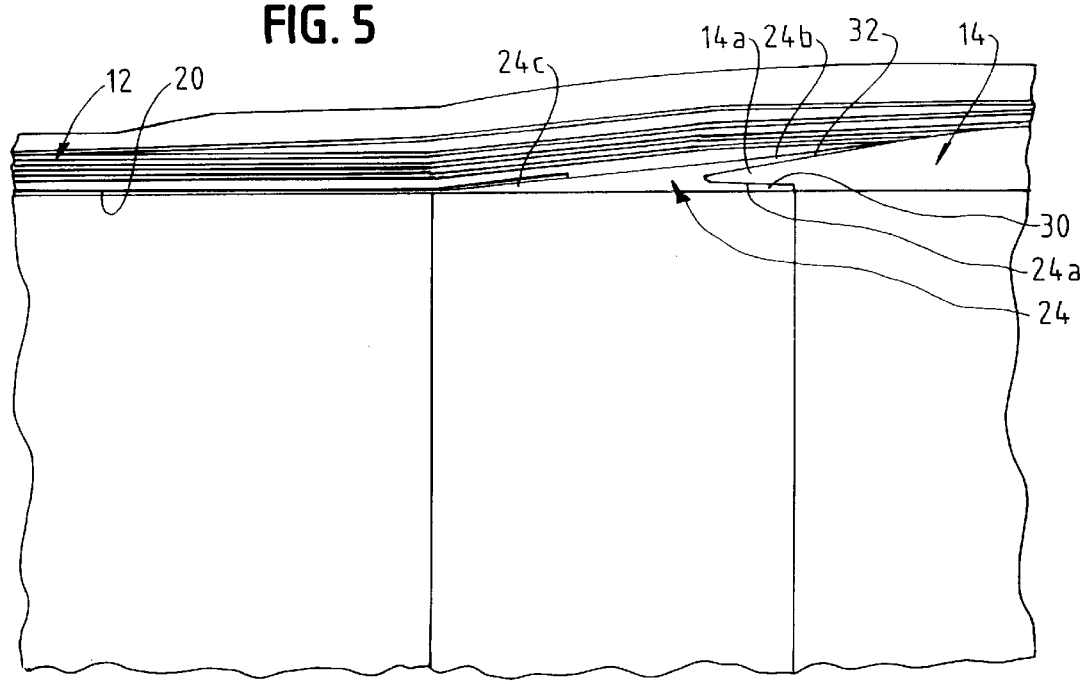
FIG. 5 is a fragmented axial section through a tube/fitting interface incorporating one embodiment of a seal according to the invention.

FIG. 1 shows the general configuration of a composite tube/end fitting interface, generally designated 10, with which the features of the invention are applicable. The interface includes a filament composite tube, generally designated 12, and a generally hollow, rigid interior end fitting, generally designated 14. The end fitting has an inboard end 14a and an outboard end 14b. The end fitting is fabricated of such rigid materials as metal. The inset of FIG. 1 shows that filament composite tube 12 includes a plurality of layers of axial reinforcement fibers 16 sandwiched between a plurality of layers of circumferential reinforcement fibers or hoops 18. An elastomeric liner 20 is disposed on the inside of the composite tube. The reinforcement fibers are compacted into a plurality of traplock grooves 22 near inboard end 14a of the fitting, with the circumferential reinforcement fibers 18 compacting the axial reinforcement fibers into the traplock grooves. Lastly, a seal, generally designated 24 and described in greater detail hereinafter, is disposed between composite tube 12 and end fitting 14 at inboard end 14a of the fitting.

Throughout the figures, common reference numerals will be used to designated like components, such as the end fittings 14, the composite tubing 12, the axial reinforcement fibers 16 and the circumferential reinforcement fibers 18. Therefore, a common understanding should run through the entire description of the figures.

With this understanding, FIG. 2 illustrates the simplest and most common embodiment of a traplock joint or interface. Fitting 14 is provided with a single conical surface 26. The diameter of the conical surface decreases toward the outboard end 14b of the fitting. During the manufacture of composite tube 12, axial reinforcement fibers 16 are placed over conical surface 26. At the completion of each layer of axial reinforcements, the outboard end of the layer is compacted and captured against the conical surface by overwrapping circumferential reinforcement fiber layers 18, forming what is referred to as a trap 28. A final layer 18a of circumferential or hoop fibers are provided as a protective coating about the exterior of the composite tube. Inboard axial forces on composite tube 12 and, therefore, the traplock joint are represented by arrows "A". Outboard axial forces on end fitting 14 and, therefore, the traplock joint are represented by arrows "B".

Generally, the features of the present invention revolve around configuring multiple traplock geometries resulting in an equal sharing of load between the multiple traplocks. The invention compensates for significant differences in the sectional properties of the metallic fitting and the composite tube. Subsequent to a straightforward sizing of gross traplock geometries based on strength requirements, the detailed fitting geometries are determined based on finite element analysis of the joint, resulting in an equal distribution of load between the multiple traplocks.

Before detailing the invention, an initial step should be taken, relating to the sizing of end fitting geometries and composite trap reinforcement based on the strength requirements of the joint. A logical first step is to assume the use of a single traplock design as shown in FIG. 2 and described above. The following gross dimensions of the joint must be determined:

(1) The diametrical envelope restrictions for the application are determined based on clearance or assembly requirements. Most applications will require a minimum inside diameter and a maximum outside diameter.

(2) The wall thickness of the fitting under the traplock is sized to safely carry the tensile and pressure loads imposed on the composite tube. This should be done per the requirements of any codes that govern the design of the product.

(3) The thickness of the axial reinforcement fibers in the joint is not limited to fibers 16 in the composite tube. For instance, localized layers of axial reinforcement fibers, as at 16A in FIG. 2 often are added over the length of the traplock. The composite material in the trap is subject to significant shearing and compression stress, generally resulting in lower fiber strengths than achievable in the composite tube.

(4) The nominal thickness of the protective outer layer of circumferential reinforcement fibers 18A, described above, also must be considered.

(5) The required bearing area of the traplock is determined by dividing the required axial load by the allowable bearing strength of the composite material. The annular projected area of the load-bearing face 26 of the traplock on a plane normal to the tube center-line must be equal to or greater than the calculated bearing area. The depth of the traplock is allocated between the thickness of the axial reinforcement fibers 16 compacted into the traplock and the circumferential reinforcement fibers 18, which is referred to as trap fill. Since the bearing strength of most polymer composite materials is 10% to 20% of typical fiber tensile strengths, trap depths sized based on the required bearing area result in an adequate thickness of trap fill in the traplock.

Taking all of these parameters into consideration, the total wall thickness of the traplock joint configured with a single traplock face as shown in FIG. 2, generally is the sum of the fitting wall thickness under the traplock, the depth of the traplock, and the thickness of axial and/or circumferential reinforcement fibers outside the traplock. If this total wall thickness is compatible with the diametral envelope restrictions for the particular application of the tube/fitting interface, then a single traplock configuration as shown in FIG. 2 and described above is appropriate.

However, in many applications, a single traplock configuration cannot be used without violating the diametral restrictions. In such cases, a multiple traplock design is used as shown in FIG. 3. Such multiple traplock designs can effectively reduce the wall thickness requirement of the tube/fitting joint or interface. In the simplest terms, by distributing the required bearing area between multiple traplocks, the total wall thickness of the traplock joint is reduced because the depths of the traplocks are reduced. A simple approach might be to simply subdivide the area into the least number of traplocks which will allow the joint to be configured without violating diametral restrictions. A comparison of FIG. 3 with FIG. 2 illustrates how an equivalent bearing area can be achieved within a smaller wall thickness, in this case by using three traplocks. However, as pointed out in the "Background", above, the use of more than one traplock does not necessarily result in improved joint performance and, in fact, it is possible to load one of the traplocks to failure before the other traplocks even carry significant load, as with many known designs which simply find it expedient to increase the number of traplocks.

On the other hand, it has been found important and the invention contemplates a particular sizing of the wall thickness of fitting 14 at the bottom of each traplock, based on the strength capabilities of the end fitting material. In those applications where the sectional moduli of the end fitting is greater than the sectional moduli of the composite material of the tube, the wall thickness of the fitting at the bottom of each traplock should be the minimum required for strength requirements to minimize the stiffness mismatch between the fitting and the tube.

According to the invention, FIG. 4 shows a multiple traplock design with n traplocks. It can be seen that the end fitting wall under Traplock (n), thickness $t_n$, must be sized to carry the total axial load. However, the thickness of the end fitting wall under Traplock (n−1), thickness $t_{n-1}$, may be sized to carry only that portion of the axial load transferred across traplock faces inboard of its location. The end fitting wall under Traplock (1), thickness $t_1$, may be sized to carrying only that portion of the axial load transferred across the inboard traplock face. (In the case of combined loadings, such as axial tension and internal pressure, the wall thickness must be sized taking all loads into account.) Conversely, if the end fitting material is much less stiff than the composite material, the end fitting wall thickness under each traplock may be sized thicker than required from strength, again to minimize the stiffness mismatch between end fitting and composite.

In addition to the differences in the wall thicknesses at the bottoms of the traplocks, the invention contemplates a multi-traplock design in which the bearing faces of the traplocks have different angles to achieve a stress equivalence between the traplocks. More particularly, once the gross geometries of the multiple traplock interface or joint have been determined based on strength and geometric requirements as described in detail above leading up to a decision whether or not a single traplock (FIG. 2) configuration is appropriate, an iterative approach is used to achieve a design with equal load sharing between traplocks according to the concepts of the invention. A unique feature of the invention is the use of different angles on the load-bearing faces of the individual traplocks to influence load sharing between traplocks. The angle of the load-bearing face of a traplock determines the relationship between load transferred across the face and the relative axial displacement of the end fitting and the filament composite at the traplock. Therefore, the use of different angles on the multiple traplocks influences the relative displacement between traplocks and, consequently, the load sharing between the traplocks. The following describes a method by which an optimized combination of angles for the load-bearing faces can be determined.

FIG. 4 illustrates the concept for a traplock joint with 'n' traplocks. As stated above, the overall joint geometry, including the amount of axial and circumferential material to be placed in each traplock, is determined based on strength and geometric constraints. The extreme inboard traplock is here referred to as Traplock (1), and $\Theta_1$ is the angle on its load-bearing face. The extreme outboard traplock is here referred to as Traplock (n), and $\Theta_n$ is the angle on its load-bearing face. A value for $\Theta_n$ is chosen, typically between 30° and 60 . $\Delta_1, \Delta_2, \ldots, \Delta_{n-2}, \Delta_{n-1}$ are given a value of 0°. The behavior of the structure under load is analyzed using the finite element method (or any other method which takes into account the relative stiffness of the fitting and composite in the axial and circumferential directions). The load share between Traplock (n) and Traplock (n−1) is evaluated by comparing peak bearing stresses in the composite material in the traps. For subsequent iterations, the value of $\Delta_{n-1}$ (and hence $\Theta_{n-1}=\Theta_n-\Delta_{n-1}$) is varied until the stress levels in Traplock (n) and Traplock (n−1) meet the desired degree of equivalence. A sequence of iterations is then performed for Traplock (n−2) and Traplock (n−3), and so on, until values for:

$$\Theta_1 = \Theta_n - \Delta_{n-1} - \Delta_{n-2} - \ldots - \Delta_3 - \Delta_2 - \Delta_1,$$

$$\Theta_2 = \Theta_n - \Delta_{n-1} - \Delta_{n-2} - \ldots - \Delta_3 - \Delta_2,$$

.
.
.

$$\Theta_{n-2} = \Theta_n - \Delta_{n-2} - \Delta_{n-1},$$

and $$\Theta_{n-1} = \Theta_n - \Delta_{n-1}$$

are obtained which result in an equal distribution of load across all traps.

Another feature of the present invention, generally, is a seal configuration capable of compensating for a differential movement between end fitting 14 and composite tube 12 without losing its integrity. The seal is in the form of a Y-shaped member, generally designated 24 in FIG. 5. The Y-shaped seal is a thermoplastic member and the material must be capable of large deformations without cracking or tearing. The use of materials exhibiting elongation at failure in excess of 200% is essential to successful seal operation. The Y-shaped configuration of the seal defines a pair of diverging arms 24a and 24b, along with a leg 24c. This geometry is configured for elastomeric materials where a high quality adhesive bond can be produced between the seal material and the end fitting. Very good bonding can be achieved between elastomers and metals if the metal surface is properly prepared. Therefore, in FIG. 5, the inboard end 14a of the fitting is machined with tapered lands 30 and 32 respectively on the inside diameter and the outside diameter of the fitting. These lands are prepared for bonding so that when the elastomeric seal is compression molded or injection molded onto the fitting, an adhesive bond is created which prevents separation of the seal from the fitting. The fitting, with the seal installed, is mounted on the mandrel that forms the inside surface of composite tube 12. During the fabrication of the composite tube, the uncured elastomeric liner 20 is applied to the entire surface of the mandrel and extends some distance outboard on the exterior surface of the seal. The composite tube then is created over the mandrel/liner by filament winding and/or braiding. When the composite is cured, the liner is bonded to the seal and a pressure-tight barrier is created to prevent the permeation of contained fluids through the composite wall.

Figure 6:
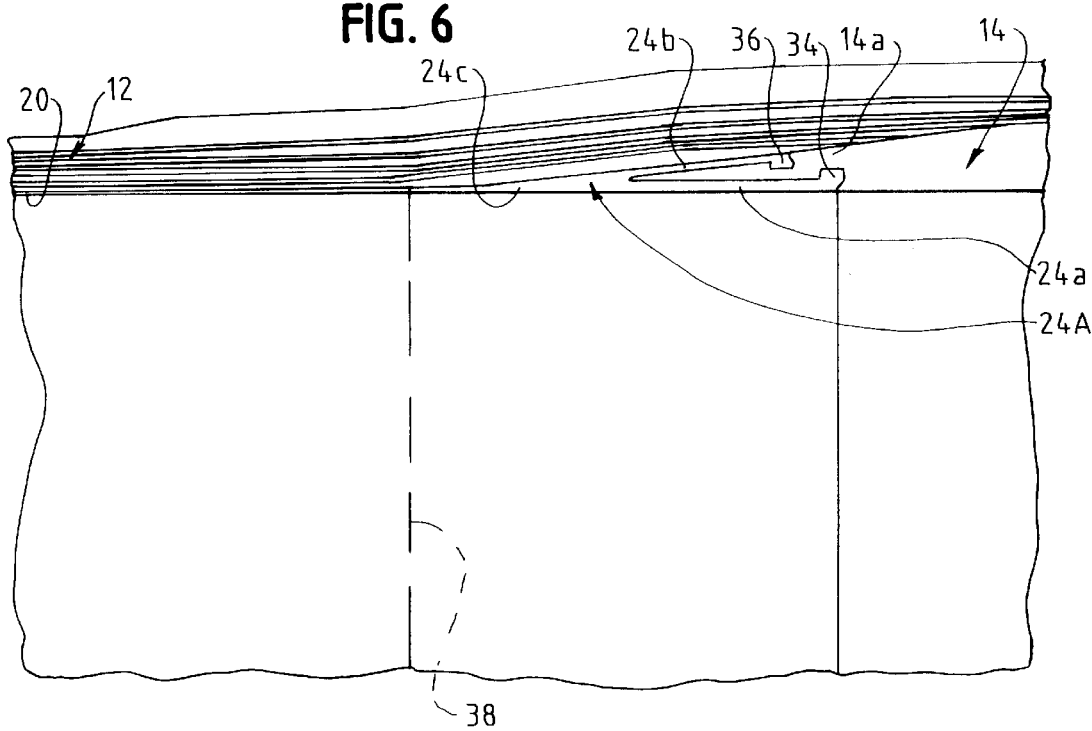
FIG. 6 is a fragmented axial section through a tube/fitting interface incorporating a second embodiment of the seal.

FIG. 6 shows a Y-shaped seal 24A that allows the use of seal materials which cannot be reliably bonded to fitting 14, such as high density polyethylene and polyamide (nylon). The inboard end 14A of fitting 14 is machined with locking grooves 34 and 36 respectively on the inside diameter and outside diameter of the fitting. The locking grooves are wider than the mouths of the grooves, or the grooves may be dovetailed in cross-section, to provide secure locking of mating ribs extending into the grooves from diverging arms 24a and 24b of the seal. Actually, when the seal is injection molded onto the fitting, the thermoplastic material flows into the locking grooves and is mechanically retained in place. Prior to installation onto a mandrel, the seal/fitting assembly is fusion welded, as at 38, to an extruded liner 20, creating a pressure tight welded liner assembly. The welded liner assembly then is slid over the mandrel and the composite tube is fabricated over the assembly.

Finally, referring back to FIGS. 2 and 3, a further feature of the invention is the provision of an elastomeric release layer 40 between the innermost filaments of composite tube 12 and the outside of end fitting 14. The release layer is unbonded to the fitting. This release layer further compensates for differential movement between the fitting and the composite tube inherent to traplock operation. The release layer may be fabricated of such materials as rubber or the like. The release layer ensures that load is concentrated on the compression side or load-bearing surfaces 26 of the traplocks.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A traplock system between an end of a filament composite tube and a generally hollow, rigid interior end fitting, comprising:

said fitting having an inboard end and an outboard end with a plurality of circumferential exterior grooves defining a plurality of traplocks spaced axially between said ends, said traplock grooves having angled bearing faces which face toward the outboard end of the fitting and against which the filaments of the composite tube bear, the angles of the bearing faces being different for at least some of the traplock grooves; and said filament composite tube having filaments disposed in the traplock grooves of the fitting to lock the tube to the fitting.

2. The traplock system of claim 1 wherein said angles of the bearing faces increase from the traplock groove nearest the inboard end of the fitting to the traplock groove nearest the outboard end of the fitting.

3. The traplock system of claim 2 wherein said angles of the traplock grooves increase at a uniform rate.

4. The traplock system of claim 1, including an elastomeric release layer between the innermost filaments of said composite tube and the outside of the end fitting, the release layer being unbonded to the fitting.

5. The traplock system of claim 1 wherein the filaments of said composite tube are compacted into the trap lock grooves.

6. The traplock system of claim 5 wherein said filaments include axially extending filaments compacted in the grooves by circumferentially extending filaments.

7. The traplock system of claim 1, including a flexible seal between the inboard end of said fitting end and the inside of the filament composite tube.

8. The traplock system of claim 7 wherein said seal is generally Y-shaped in cross-section to define a pair of diverging arms embracing the inside and the outside of the fitting at the inboard end thereof.

9. The traplock system of claim 8 wherein said composite tube has an interior elastomeric liner, and said Y-shaped seal defines a leg extending from said diverging arms, with the leg being unitary with said liner.

10. The traplock system of claim 7 wherein said composite tube has an interior elastomeric liner which is unitary with the flexible seal.

11. The traplock system of claim 1 wherein the wall thicknesses between the bases of the traplock grooves and the inside of the generally hollow fitting increase from the traplock groove nearest the inboard end of the fitting to the traplock groove nearest the outboard end of the fitting.

12. The traplock system of claim 11 wherein said wall thicknesses increase at a uniform rate.

* * * * *